United States Patent
Dutta (10) Patent No.: US 12,345,535 B2
(45) Date of Patent: Jul. 1, 2025

(54) SYSTEM AND METHOD FOR RIDESHARE MATCHING BASED ON LOCALITY SENSITIVE HASHING

(71) Applicant: TURING RESEARCH INC., Mountain View, CA (US)

(72) Inventor: Chinmoy Dutta, Mountain View, CA (US)

(73) Assignee: TURING RESEARCH INC., Seattle, WA (US)

( * ) Notice: Subject to any disclaimer, the term of this patent is extended or adjusted under 35 U.S.C. 154(b) by 505 days.

(21) Appl. No.: 17/178,123

(22) Filed: Feb. 17, 2021

(65) Prior Publication Data

US 2022/0260376 A1    Aug. 18, 2022

(51) Int. Cl.
| | |
|---|---|
| *G01C 21/34* | (2006.01) |
| *G06F 18/2132* | (2023.01) |
| *G06N 5/01* | (2023.01) |
| *G06Q 10/02* | (2012.01) |

(52) U.S. Cl.
CPC ..... *G01C 21/3438* (2013.01); *G01C 21/3446* (2013.01); *G01C 21/3453* (2013.01); *G06F 18/21322* (2023.01); *G06N 5/01* (2023.01); *G06Q 10/02* (2013.01); *G06F 18/21326* (2023.01)

(58) Field of Classification Search
CPC ............ G01C 21/3438; G01C 21/3446; G01C 21/3453; G06F 18/21322; G06F 18/21326; G06N 5/01; G06Q 10/02
See application file for complete search history.

(56) References Cited

U.S. PATENT DOCUMENTS

| | | | |
|---|---|---|---|
| 8,126,903 B2 * | 2/2012 | Lehmann | G06Q 10/06 |
| | | | 707/758 |
| 9,880,011 B2 * | 1/2018 | Ding | G01C 21/3881 |
| 10,197,410 B2 * | 2/2019 | Guo | G06F 16/951 |
| 10,671,961 B2 * | 6/2020 | Cao | G06Q 50/40 |
| 10,769,558 B2 * | 9/2020 | Dutta | G01C 21/3423 |
| 11,107,352 B2 * | 8/2021 | Ramot | G06N 5/04 |
| 11,150,098 B2 * | 10/2021 | Chen | G01C 21/3438 |
| 11,170,652 B2 * | 11/2021 | Gardner | G01C 21/3453 |

(Continued)

FOREIGN PATENT DOCUMENTS

| | | | | |
|---|---|---|---|---|
| CN | 105070044 B | * | 5/2017 | |
| WO | WO-2020133549 A1 | * | 7/2020 | |
| WO | WO-2020155135 A1 | * | 8/2020 | G06F 17/10 |

OTHER PUBLICATIONS

"Dutta, Chinmoy, When Hashing Met Matching: Efficient Spatio-Temporal Search for Ridesharing, 2021, The Thirty-Fifth AAAI Conference on Artificial Intelligence (AAAI-21)" (Year: 2021).*

(Continued)

*Primary Examiner* — Ramya P Burgess
*Assistant Examiner* — Christopher R Cardimino (57) ABSTRACT

A system for rideshare matching using locality sensitive hashing is disclosed, including at least one rider device and at least one driver device in operable connection with a network. A rideshare application is in operable communication with the network and configured for matching a driver to a rider within a match pool via an artificial intelligence engine operating a locality sensitive hashing module.

20 Claims, 6 Drawing Sheets

(56) References Cited

U.S. PATENT DOCUMENTS

| | | | | |
|---|---|---|---|---|
| 2017/0016733 A1* | 1/2017 | Rolf | ................... | G01C 21/343 |
| 2018/0224866 A1* | 8/2018 | Alonso-Mora | ........ | G08G 1/202 |
| 2018/0240054 A1* | 8/2018 | Li | ................... | G06Q 10/06311 |
| 2019/0050787 A1* | 2/2019 | Munafo | ......... | G06Q 10/063118 |
| 2019/0051174 A1* | 2/2019 | Haque | ................... | G01C 21/34 |
| 2019/0339087 A1* | 11/2019 | Jindal | ................... | G06Q 50/40 |
| 2021/0200768 A1* | 7/2021 | Lesner | ............. | G06F 16/24542 |
| 2021/0302174 A1* | 9/2021 | Abdulla | ................. | H04W 4/40 |
| 2022/0026222 A1* | 1/2022 | Tian | ..................... | G06N 20/00 |

OTHER PUBLICATIONS

"Dutta, Chinmoy, When Hashing Met Matching: Efficient Search for Potential Matches in Ride Sharing, Sep. 7, 2018, arXiv.org" (Year: 2018).*

"Dutta, Chinmoy, When Hashing Met Matching: Efficient Spatio-Temporal Search for Ridesharing, May 18, 2021, The Thirty-Fifth AAAI Conference on Artificial Intelligence (AAAI-21)" (Year: 2021).*

\* cited by examiner

SYSTEM AND METHOD FOR RIDESHARE MATCHING BASED ON LOCALITY SENSITIVE HASHING

TECHNICAL FIELD

The embodiments generally relate to computerized systems for real-time rideshare matching using spatio-temporal search methods, and more particularly to computerized systems for rideshare matching in real-time using locality sensitive hashing.

BACKGROUND

Sharing rides is extremely beneficial for planning urban transportation as it promises to provide a solution for the serious urban challenges of excessive traffic congestion, resource consumption and air pollution, while providing efficient, flexible and affordable mobility options. Real-time information and monitoring of urban mobility as well as the ability to do large scale computation efficiently on the cloud allow on-demand shared mobility platforms to enable real-time sharing of rides at unprecedented levels. Several studies have confirmed the potential of real-time urban-scale ridesharing to reduce the burden on urban transportation. To realize this potential, these platforms must solve the rideshare matching problem of forming rideshare trips where each trip consists of a driver route and one or more riders, minimizing the inconvenience to riders (increased pick-up wait and travel time, detour, etc.) and maximizing the benefits of sharing (reduced cost of serving rides). However, solving this problem in real-time and at urban scale with a match pool of tens of thousands of rides and driver routes is a very hard combinatorial problem and presents formidable computational challenges.

Most successful approaches to solving the rideshare matching problem uses the graph-theoretic notion of shareability networks. The nodes of the network are rides and driver routes in the match pool. Edges of the network can be thought of as potential rideshare matches. An edge between two ride nodes signifies feasibility to serve them together, while an edge between a ride node and a driver route node signifies the feasibility to add the ride to the driver's route.

Once the shareability network is constructed (in particular, potential rideshare matches are known), there are several approaches to combine such matches and form rideshare trips such as dynamic programming, greedy methods, constraint satisfaction programs etc. Computing the shareability network in real time is computationally very hard. Brute force comparison of every pair of nodes has a quadratic complexity and is ruled out.

Prior works for constructing shareability networks are all heuristic methods. These prior solutions have a number of shortcomings. For example, these solutions only compare and form edges between spatially nearby nodes (rides and driver routes). While some compute haversine overlap between nodes to find edges of the network. The heuristic methods have several disadvantages including limited trip choices, lack of robustness, ignorance of the road network, inability to handle realistic cost functions, and insensitivity to real-time traffic conditions. Those having limited trip choices lose achievable match utility due to ignoring trips between non-nearby nodes (especially problematic if some rides are pre-scheduled and thus can be far away without violating pickup constraints). The lack of robustness manifests when many rides arrive at the same time within a geographically constrained area (train stations, concert venues), which results in the heuristic of comparing nearby nodes fail. Heuristics which have ignorance of the road network are insensitive to the real road network, and thus lose match utility. Heuristics having inability to handle realistic cost functions depend only on the distance metric and cannot optimize for realistic cost functions. Ride costs often depend on a combination of several factors such as time, distance, tolls, fees etc. Heuristics which are insensitive to real-time traffic conditions are unable to adapt to real-time traffic conditions such as weather, events, construction zones, accidents, etc.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments provided herein relate to a system for rideshare matching using locality sensitive hashing is disclosed, including at least one rider device and at least one driver device in operable connection with a network. A rideshare application is in operable communication with the network and configured for matching a driver to a rider within a match pool via an artificial intelligence engine operating a locality sensitive hashing module.

A method for rideshare matching using locality sensitive hashing is disclosed, including constructing a space-time discretized route for each of a plurality of ride routes and driver routes. Next a preprocessing vector representation is constructed for each of the plurality of ride routes and driver routes. A locality sensitive hashing data structure is constructed with the preprocessing vector representations. Further, a query vector representation is constructed for each of the plurality of ride routes and driver routes. A matching ride route and driver route is found for each ride request using the locality sensitive hashing data structure and at least one rideshare trip is constructed from the retrieved potential matches.

In one aspect, the method provided herein can handle rides and driver routes uniformly due to its rigorous mathematical formulation of the problem. The method is efficient in runtime as it employs the Artificial Intelligence search technique of locality sensitive hashing that works very well with high dimensional data, allowing its use in real-time.

In one aspect, the method is robust as it is not based on the assumption of having only a few rides within a geographical constrained area at a given time and is based on principled, robust and scalable search techniques instead.

In one aspect, the method does not lose efficiency by restricting trips to be formed only between nearby rides and driver routes. Rather, it searches for potential matches with best match utilities globally in the match pool.

In one aspect, the method exploits the knowledge of the real physical road network which the prior works do not. This contributes significantly to its optimality in terms of match utility.

In one aspect, the method effectively adapts to real-time traffic conditions which prior works do not. Such real-time traffic conditions include weather, events, road closures, diversions, constructions, accidents etc. that can change the cost of routes.

In one aspect, the method can handle all linear functions for defining cost of routes and, hence, match utility. A linear cost function is such that the total cost along a route is the sum of the costs incurred along the route segments. This includes almost all realistic cost functions such as distance travelled, time of travel, tolls and fees along the route etc., and any linear combination of these. Prior works mostly consider only the distance cost function.

In one aspect, the method can handle both current rides and future pre-scheduled rides together in the same match pool, providing additional matching utility and marketplace efficiency.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a system and method of rideshare matching based on the Artificial Intelligence technique of locality sensitive hashing (LSH). LSH is a technique for efficient similarity search employed in a wide variety of engineering and scientific domains. However, its use had not been introduced for rideshare matching in the prior art. The method and system for efficient rideshare matching in real-time from a match pool of tens of thousands of ride requests (henceforth simply called rides) and driver routes is provided to efficiently and effectively match rides with suitable drivers. The method depends on a novel efficient randomized spatio-temporal search algorithm.

The embodiments include a novel efficient randomized spatio-temporal search method for finding potential rideshare matches. As stated above, once the potential matches are found efficiently, rideshare trips can be constructed using a variety of approaches such as dynamic programming, greedy methods, solving constraint satisfaction programs etc. and the rideshare matching problem can be solved. The method works by transforming the potential match finding problem into a similarity search problem and employing the technique of locality sensitive hashing for similarity search.

The method includes the steps of transforming rides and driver routes into vector representations in a high-dimensional space capturing their essential spatial properties (physical route in the real road network) as well as temporal properties (arrival time, service time constraints etc.). Next, the method includes the step of deriving a similarity measure for this vector space that captures the notion of match utility, rides and driver routes with high utility from being matched together have similar representations (according to the defined similarity measure); while those that are not feasible to be matched together or have low utility from being matched together have dissimilar representations. The method further includes the step of employing locality sensitive hashing technique for similarity searches in this space. This amounts to finding, for each ride, top rides and driver routes with highest match utility with it.

The system utilizes the artificial intelligence technique of locality sensitive hashing. A vector representation for rides and driver routes is provided which preserves their essential spatio-temporal features important for rideshare matching (physical route in the real road network, time of arrival, maximum allowed delay etc.). The system provides a similarity measure on spatio-temporal vector representations for rides and driver routes that capture utility of matching them together.

The method can very efficiently incorporate the information of the real road network in making ride matching decisions. Further, the method can work with a hybrid match pool of current as well as future pre-scheduled rides. Any cost function can be handled while defining the utility of matching as long as it is linear in the route (I.e., the total cost along a route is the sum of costs incurred along the segments of the route). Examples include distance traveled, time of travel, tolls and fees along the route, etc. or any linear combination of these. The method is dynamic and can adapt to changing traffic conditions (weather, accidents, events, closures, constructions etc.) as costs of route segments change (as long as this information is available in real-time which is the case with most modern routing systems). Prior heuristic methods are static and do not adapt.

Figure 1:
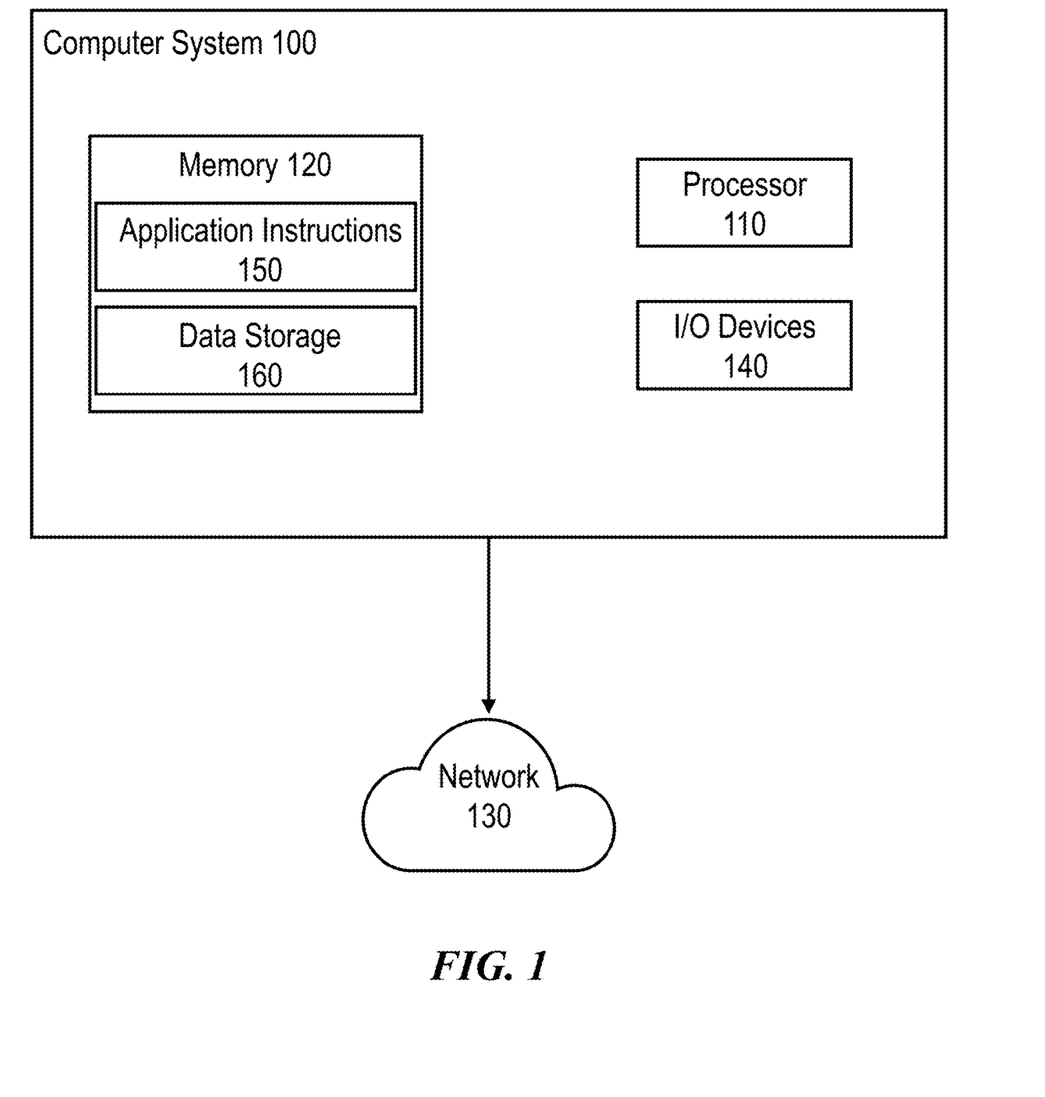
FIG. 1 illustrates a block diagram of the network infrastructure, according to some embodiments.

FIG. 1 illustrates a computer system 100, which may be utilized to execute the processes described herein. The computer system 100 is comprised of a standalone computer or mobile computing device, a mainframe computer system, a workstation, a network computer, a desktop computer, a laptop, or the like. The computer system 100 includes one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface.

Processors 110 suitable for the execution of a computer program include both general and special purpose microprocessors and any one or more processors of any digital computing device. The processor 110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

A network interface may be configured to allow data to be exchanged between the computer system 100 and other devices attached to a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a database 160, comprising various data accessible by the application instructions 150. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, PYTHON, GOLANG etc.).

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

Figure 2:
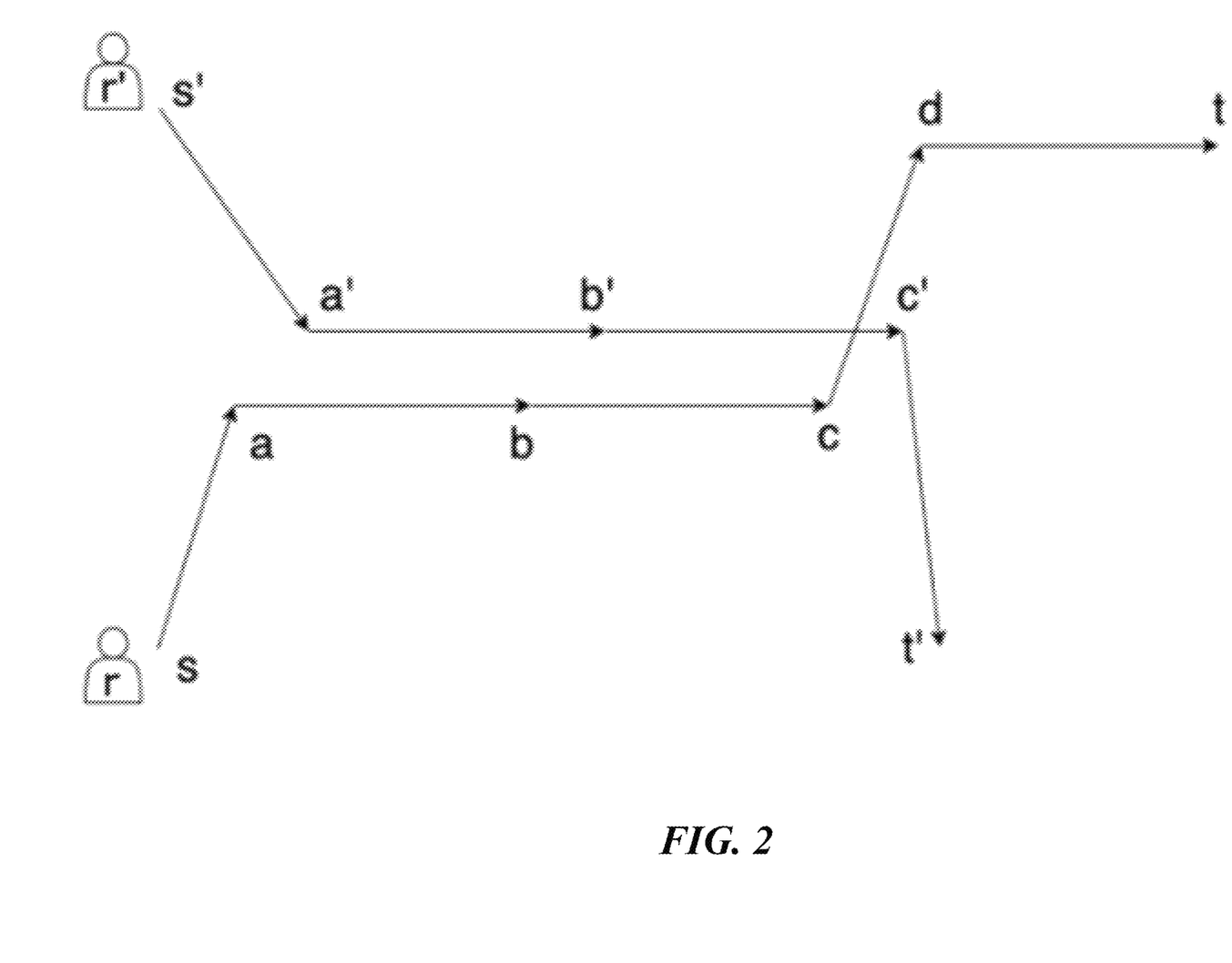
FIG. 2 illustrates a schematic to describe how to encode the spatial properties of a ride, wherein two ride (r and r') are shown with their associated routes, according to some embodiments.

FIG. 2 illustrates a diagram wherein the spatial properties of the ride are encoded. FIG. 2 illustrates two rides (r and r') with their associated routes. Ride r has the routes s, a, b, c, d and t and ride r' has the routes s', a', b', c', and t'. The utility of matching r and r' together arises from the similar segments in their routes which would contribute to cost savings if the rides are served together. In FIG. 2, segments (a,b) and (b,c) in the route of ride r are similar to segments a',b' and b',c' in the route of ride r' respectively.

Figure 3:
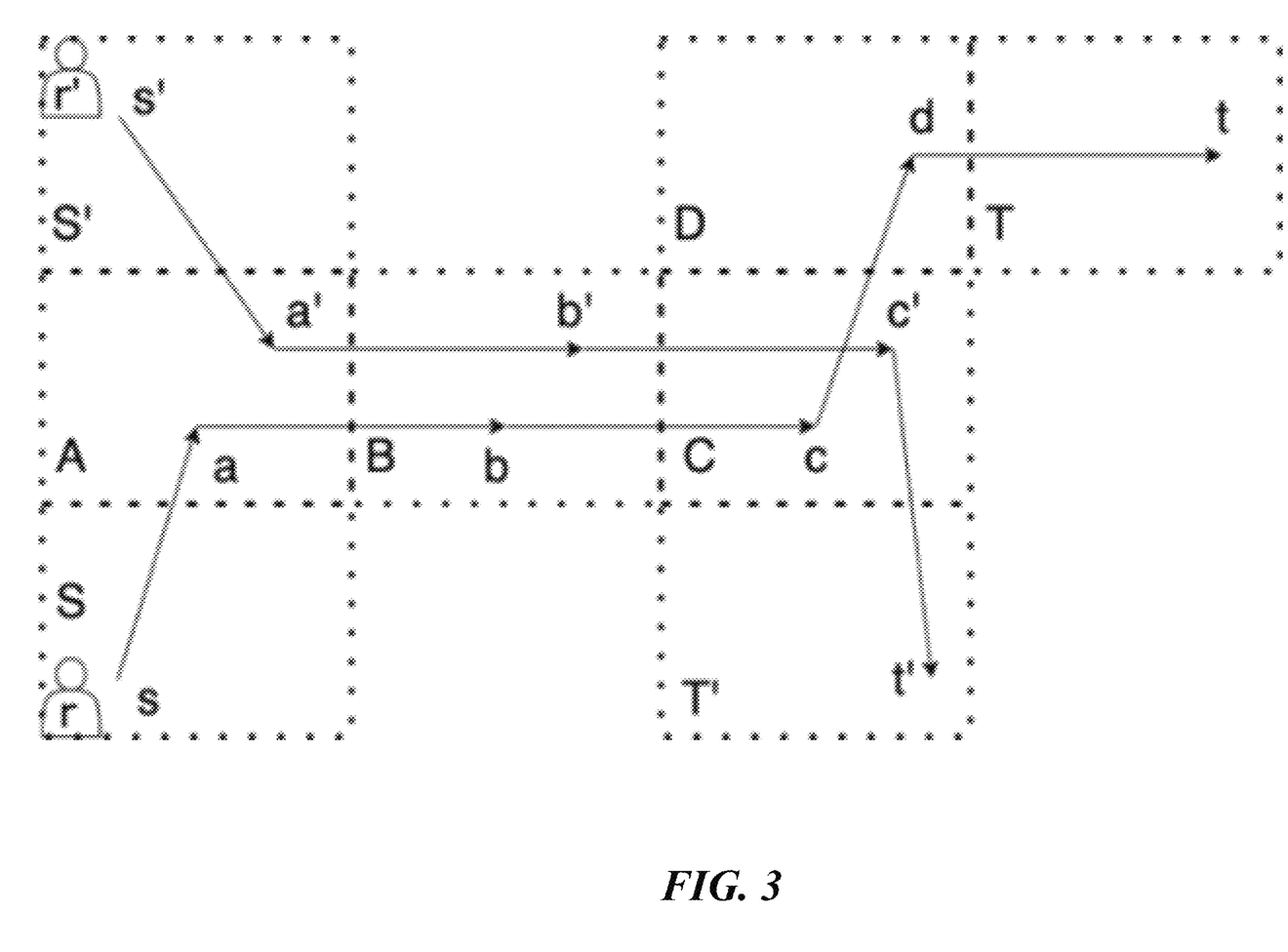
FIG. 3 illustrates a schematic to describe the encoding of spatial properties of ride while capturing spatial proximity by discretizing space, wherein the same two ride (r and r') are shown with space discretized, according to some embodiments.

In some embodiments, to encode the spatial properties of rides, the system and method utilize the entire physical route of the ride. However, to capture spatial proximity, the system and method discretizes space as shown in FIG. 3. This can be done using geohashes or S2 cells.

Figure 4:
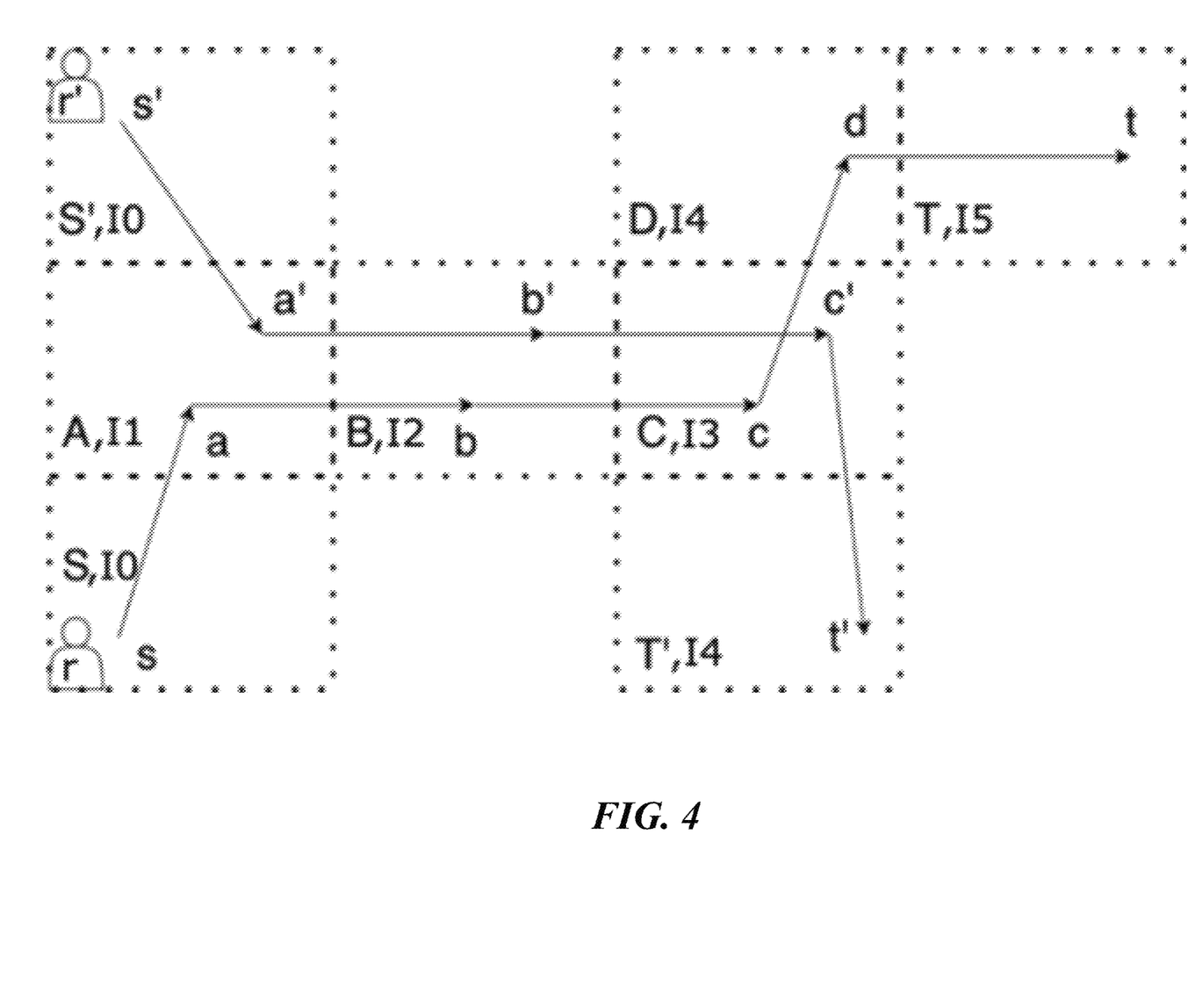
FIG. 4 illustrates a schematic to describe the encoding of spatial properties of ride while capturing spatial proximity by discretizing space, according to some embodiments.

FIG. 3 illustrates two rides as shown in FIG. 2 while including each ride's space discretized routes. FIG. 4 illustrates two rides as shown in FIG. 2 while including each ride's space and time discretized route. Capital letters denote discretized space blocks. Ride r has the space discretized route S, A, B, C, D, T and ride r' has space discretized route S', A, B, C, T'. With space discretized, the similar segments between routes of rides r and r' are simply the common space discretized segments in their routes (A, B) and (B, C). To encode the temporal properties of rides, the embodiments annotate the space discretized routes with time of traversal. However, to capture temporal similarity, the embodiments similarly discretize time. The interval of discretization can, for example, be proportional to the allowable delay in serving a ride. This will enable rides that have similar segments traversed in similar times to be matched together, as their common space discretized route nodes will have correspondingly same time interval annotations.

For example, suppose ride r traverses S, A, B, C, D, T in time intervals I0, I1, I2, I3, I4, and I5 respectively. Similarly, ride r' traverses S', A, B, C, T' in time intervals I0, I1, I2, I3, and I4 respectively. The rides r and r' are represented with their space-time discretized routes of <(S, I0), (A, I1), (B, I2), (C, I3), (D, I4), (T, I5)> and <(S', I0), (A, I1), (B, I2), (C, I3), (T', I4)>, respectively. The segment <(A, I1), (B, I2)> and <(B, I2), (C, I3)> are the common space-time discretized segments.

Finally, the system turns the space-time discretized routes into vector representations. The vector space is a high-dimensional space with each possible space-time discretized route segment as a dimension. Each ride and driver route has two vector representations including a pre-preprocessing vector representation and a query vector representation. The pre-processing vector representation includes a vector with a "0" in every dimension except for dimensions that correspond to a segment in its space-time discretized route, in which case it is the cost of that segment. The query vector representation is similar to the pre-processing vector representation but there is simply a '1' in dimensions that correspond to a segment in its space-time discretized route.

In general, there can be other methods of vectorization that encodes the spatio-temporal properties of rides and driver routes that are significant for ride matching. The pre-processing vector representation and the query vector representation mentioned here are examples of such vectorization of the spatio-temporal properties of rides and driver routes.

In the next step, the system derives the similarity. The match utility between two rides or a ride and a driver route is proportional to the total cost of the common segments, which would translate to savings if they are served together. As shown in FIG. 4, for rides r and r', match utility is proportional to the cost of segment <(A, I1), (B, I2)>+cost of segment <(B, I2), (C, I3)>. With the preprocessing and query vector representations in place, this can simply be expressed as the inner product between the preprocessing vector representation of one with the query vector representation of the other. This is the similarity measure defined in the vector space of representations.

In some embodiments, the preprocessing vector representation is used while constructing the asymmetric locality sensitive hashing dataset and the query vector representation is used while querying the asymmetric locality sensitive hashing dataset to find overlapping matches for a ride. With the above two vector representations the sum of the costs of the common edges in the intersection of the spatio-temporal routes of rides r and r' is the inner product between the preprocessing vector representation of r and the query vector representation of r'. Thus, approximate overlapping match search can be solved via approximate maximum inner product search (MIPS).

In general, the similarity measure will depend upon the specific vectorization method used. For example, inner product is a suitable similarity measure with the vectorization scheme presented here that constructs a preprocessing vector representation and a query vector representation for each ride and driver route.

Next, the system performs the similarity search. With representations defined mathematically in a vector space, the system can use the technique of locality sensitive hashing to find similar rides and driver routes as matches.

In some embodiments with similarity defined as inner product, for the purpose of similarity search, the system combines an asymmetric LSH construction that transforms Maximum Inner Product search problem to Maximum Cosine Similarity Search with a LSH scheme for Maximum Cosine Similarity Search. For example, the cross-polytope LSH construction for Maximum Cosine Similarity Search can be used for this purpose.

Figure 5:
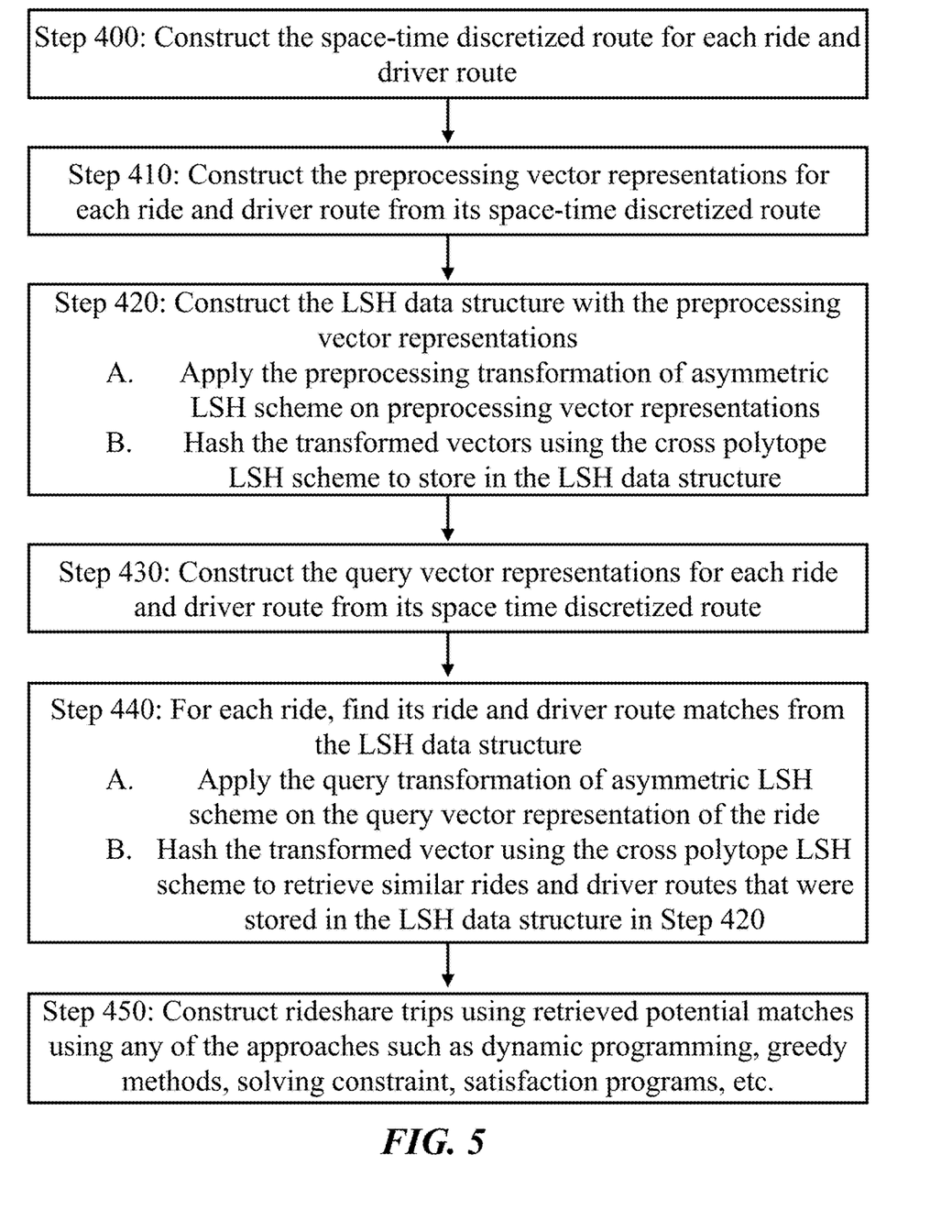
FIG. 5 illustrates a flowchart for a method for constructing rideshare trips using locality sensitive hashing, according to some embodiments.

FIG. 5 illustrates a flowchart of the method. In step 400, the system constructs the space time discretized route for each ride and driver route. In step 410, the system constructs the preprocessing vector representations for each ride and driver route from its space-time discretized route. In step 420, the system constructs the LSH data structure with the preprocessing vector representations. This is performed by applying the preprocessing transformation of asymmetric LSH scheme on preprocessing vector representations. The system then hashes the transformed vectors using the cross polytope LSH scheme to store in the LSH data structure. In step 430, the system constructs the query vector representations for each ride and driver route from its space time discretized route. In step 440, for each ride, the system finds its ride and driver route matches from the LSH data structure. The system applies the query transformation of asymmetric LSH scheme on the query vector representation of the ride. The system then hashes the transformed vector using the cross polytope LSH scheme to retrieve similar ride and driver routes that were stored in the hashed buckets in step 420. In step 450, the system constructs rideshare trips using retrieved potential matches using any of the approaches such as dynamic programming, greedy methods, solving constraint satisfaction programs, etc.

In some embodiments, to improve the success probability of finding high utility potential matches for a ride, the system may consider multiple alternate routes for rides and driver routes. In this alternative, the system constructs vector representations for all the alternate routes to represent the corresponding ride or driver route. Combining ride matches obtained from alternate routes significantly improves success probability.

In some embodiments, the system may discretize space and time in different granularities which will give rise to multiple representations for each ride and driver route. The system then uses a hybrid method repeating the original method with different discretizations and combining the results.

In some embodiments, the system can persist the constructed LSH data structure and incrementally add the newly arrived rides while deleting the rides already assigned or picked up. Driver routes should be replaced in the data structure whenever they get updated and also periodically to prevent them from becoming too stale. This incremental approach can improve runtime efficiency in real-time operation.

In some embodiments, the system can include current as well as pre-scheduled future rides in the same match pool. The temporal aspect of the method and system presented here can effectively find matches between such rides. For example, a current ride or driver route can be matched to a future ride pre-scheduled to arrive 30-minutes from now if the current ride or driver route is expected to reach the pickup of the future ride in that time and have good overlap with its route thereafter.

In some embodiments, the system may use stochastic optimization methods to make matches predicting for future ride arrivals. Some of the possibilities include stochastic programming, approximate dynamic programming and neural methods.

Figure 6:
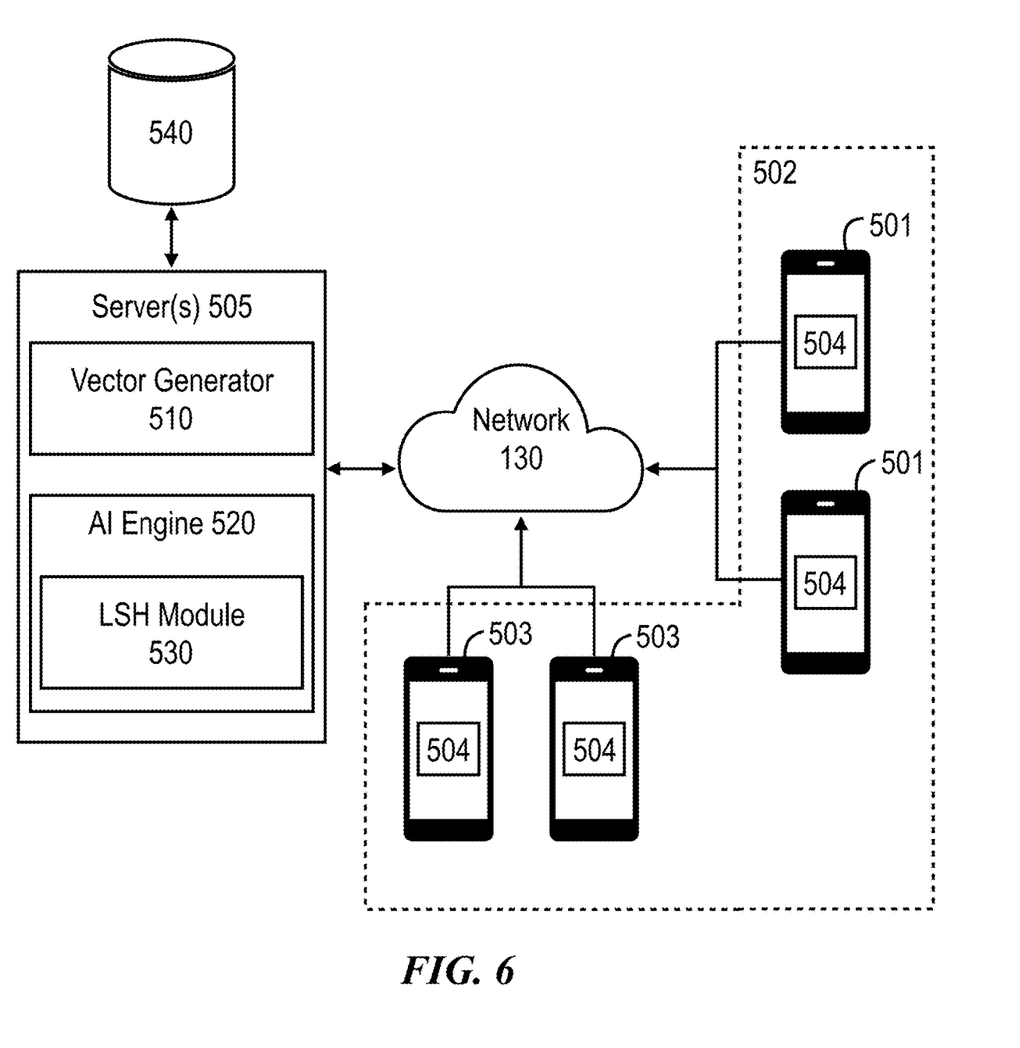
FIG. 6 illustrates a block diagram of the rideshare matching system, according to some embodiments.

FIG. 6 illustrates a block diagram of the rideshare system including a match pool 502 including a plurality of riders in operable communication with a rider device 501. Each rider device is in communication with a rideshare application 504. A plurality of driver devices 503 are in operable communication with the rideshare application 504. Server(s) 505 is in operable communication with a locality sensitive hashing data structure 540. The server operates a vector generator 510 configured to generate a preprocessing vector representation and a query vector representation. The artificial intelligence engine 520 operates a locality sensitive hashing module 530 to perform locality sensitive hashing procedures as described hereinabove. The rideshare application 504 is utilized by the rider to request and find a rideshare trip provided by the drivers.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system comprising:
    at least one processor; and
    a non-transitory computer readable storage medium comprising instructions that, when executed by the at least one processor, cause the system to perform operations comprising:
        receiving, by a real-time rideshare matching system, at least one ride request;
        identifying, by the real-time rideshare matching system, at least one driver available to serve a ride request;
        constructing, by the real-time rideshare matching system, a match pool comprising a plurality of match candidates, wherein a match candidate is a ride request of the at least one ride request or a driver of the at least one driver;
        obtaining, by the real-time rideshare matching system, a route profile for each match candidate of the match pool, wherein the route profile associated with a match candidate of the match pool comprises a route component corresponding to a potential route for the match candidate, a time component corresponding to a potential time of traversing the potential route by the match candidate, and a cost component corresponding to a potential cost of traversing the potential route;
        constructing, by the real-time rideshare matching system, a model for each match candidate of the match pool, wherein the model associated with a match candidate of the match pool is constructed based at least in part on the route profile associated with the match candidate;
        constructing, by the real-time rideshare matching system, a preprocessing vector and a query vector for each match candidate of the match pool, wherein the preprocessing vector and the query vector associated with a match candidate of the match pool are constructed based on the model associated with the match candidate such that a degree of similarity, determined appropriately, between the model associated with a first match candidate of the match pool and the model associated with a second match candidate of the match pool is correlated with a degree of similarity, determined based on a vector similarity measure, between the preprocessing vector constructed based on the model associated with the first match candidate and the query vector constructed based on the model associated with the second match candidate;
        constructing, by the real-time rideshare matching system, a locality-sensitive hashing data structure appropriate for the vector similarity measure;
        storing, by the real-time rideshare matching system, the identifier of each match candidate of the match pool in the locality-sensitive hashing data structure, wherein the identifier of a match candidate of the match pool is stored in one or more hash buckets of the locality-sensitive hashing data structure, the one or more hash buckets determined based on hashing the preprocessing vector associated with the match candidate;
        constructing, by the real-time rideshare matching system, a potential match set for at least one match candidate of the match pool, wherein the potential match set associated with a match candidate of the at least one match candidate comprises identifiers retrieved from one or more hash buckets of the locality-sensitive hashing data structure, the one or more hash buckets determined based on hashing the query vector associated with the match candidate;
        generating, by the real-time rideshare matching system, a rideshare trip based at least in part on the potential match set associated with a match candidate of the match pool, wherein the rideshare trip comprises a driver of the at least one driver and one or more ride requests of the at least one ride request;
        assigning, by the real-time rideshare matching system, one or more ride requests of the at least one ride request to a driver of the at least one driver based on the rideshare trip to be served by the driver; and
        updating, by the real-time rideshare matching system, the route of a driver of the at least one driver based on the rideshare trip to serve one or more ride requests assigned to the driver.

2. The system of claim 1, wherein the vector similarity measure is based on inner product similarity.

3. The system of claim 1, further comprising instructions that, when executed by the at least one processor, cause the system to perform operations comprising post-processing, by the real-time rideshare matching system, the potential match set associated with a match candidate of the match pool to filter or augment the potential match set using heuristics comprising Haversine distance approximations, directional route similarity, spatial proximity, or a combination thereof.

4. The system of claim 1, wherein the cost component of the route profile associated with a match candidate of the match pool is determined based on features of the potential route corresponding to the route component of the route profile, the features comprising the length of the potential route, a potential duration of traversing the potential route at the potential time corresponding to the time component of the route profile, potential taxes and tolls to be incurred in traversing the potential route, or a combination thereof.

5. The system of claim 1, wherein the model associated with a match candidate of the match pool comprises at least one route segment profile constructed based on the route profile of the match candidate, wherein a route segment profile of the at least one route segment profile comprises a route segment component corresponding to a route segment of the potential route corresponding to the route component of the route profile, a time segment component corresponding to a potential time of traversing the route segment by the match candidate determined based on the time component of the route profile, and a cost segment component corresponding to a potential cost of traversing the route segment determined based on the cost component of the route profile.

6. The system of claim 5, wherein the degree of similarity between the model associated with a first match candidate of the match pool and the model associated with a second match candidate of the match pool is determined based on an overlap between the model associated with the first match candidate and the model associated with the second match candidate.

7. A non-transitory computer readable storage medium comprising instructions that, when executed by at least one processor of a computing device, cause the computing device to perform operations comprising:
  receiving, by a real-time rideshare matching system, at least one ride request;
  identifying, by the real-time rideshare matching system, at least one driver available to serve a ride request;
  constructing, by the real-time rideshare matching system, a match pool comprising a plurality of match candidates, wherein a match candidate is a ride request of the at least one ride request or a driver of the at least one driver;
  obtaining, by the real-time rideshare matching system, a route profile for each match candidate of the match pool, wherein the route profile associated with a match candidate of the match pool comprises a route component corresponding to a potential route for the match candidate, a time component corresponding to a potential time of traversing the potential route by the match candidate, and a cost component corresponding to a potential cost of traversing the potential route;
  constructing, by the real-time rideshare matching system, a model for each match candidate of the match pool, wherein the model associated with a match candidate of the match pool is constructed based at least in part on the route profile associated with the match candidate;
  constructing, by the real-time rideshare matching system, a preprocessing vector and a query vector for each match candidate of the match pool, wherein the preprocessing vector and the query vector associated with a match candidate of the match pool are constructed based on the model associated with the match candidate such that a degree of similarity, determined appropriately, between the model associated with a first match candidate of the match pool and the model associated with a second match candidate of the match pool is correlated with a degree of similarity, determined based on a vector similarity measure, between the preprocessing vector constructed based on the model associated with the first match candidate and the query vector constructed based on the model associated with the second match candidate;
  constructing, by the real-time rideshare matching system, a locality-sensitive hashing data structure appropriate for the vector similarity measure;
  storing, by the real-time rideshare matching system, the identifier of each match candidate of the match pool in the locality-sensitive hashing data structure, wherein the identifier of a match candidate of the match pool is stored in one or more hash buckets of the locality-sensitive hashing data structure, the one or more hash buckets determined based on hashing the preprocessing vector associated with the match candidate;
  constructing, by the real-time rideshare matching system, a potential match set for at least one match candidate of the match pool, wherein the potential match set associated with a match candidate of the at least one match candidate comprises identifiers retrieved from one or more hash buckets of the locality-sensitive hashing data structure, the one or more hash buckets determined based on hashing the query vector associated with the match candidate;
  generating, by the real-time rideshare matching system, a rideshare trip based at least in part on the potential match set associated with a match candidate of the match pool, wherein the rideshare trip comprises a driver of the at least one driver and one or more ride requests of the at least one ride request;
  assigning, by the real-time rideshare matching system, one or more ride requests of the at least one ride request to a driver of the at least one driver based on the rideshare trip to be served by the driver; and
  updating, by the real-time rideshare matching system, the route of a driver of the at least one driver based on the rideshare trip to serve one or more ride requests assigned to the driver.

8. The non-transitory computer readable storage medium of claim 7, wherein the vector similarity measure is based on inner product similarity.

9. The non-transitory computer readable storage medium of claim 7, further comprising instructions that, when executed by the at least one processor, cause the computing device to perform operations comprising post-processing, by the real-time rideshare matching system, the potential match set associated with a match candidate of the match pool to filter or augment the potential match set using heuristics comprising Haversine distance approximations, directional route similarity, spatial proximity, or a combination thereof.

10. A computer-implemented method comprising:
  receiving, by a real-time rideshare matching system, at least one ride request;
  identifying, by the real-time rideshare matching system, at least one driver available to serve a ride request;
  constructing, by the real-time rideshare matching system, a match pool comprising a plurality of match candidates, wherein a match candidate is a ride request of the at least one ride request or a driver of the at least one driver;
  obtaining, by the real-time rideshare matching system, a route profile for each match candidate of the match pool, wherein the route profile associated with a match candidate of the match pool comprises a route component corresponding to a potential route for the match candidate, a time component corresponding to a potential time of traversing the potential route by the match candidate, and a cost component corresponding to a potential cost of traversing the potential route;
  constructing, by the real-time rideshare matching system, a model for each match candidate of the match pool, wherein the model associated with a match candidate of the match pool is constructed based at least in part on the route profile associated with the match candidate;
  constructing, by the real-time rideshare matching system, a preprocessing vector and a query vector for each match candidate of the match pool, wherein the preprocessing vector and the query vector associated with a match candidate of the match pool are constructed based on the model associated with the match candidate such that a degree of similarity, determined appropriately, between the model associated with a first match candidate of the match pool and the model associated with a second match candidate of the match pool is correlated with a degree of similarity, determined based on a vector similarity measure, between the preprocessing vector constructed based on the model associated with the first match candidate and the query vector constructed based on the model associated with the second match candidate;

constructing, by the real-time rideshare matching system, a locality-sensitive hashing data structure appropriate for the vector similarity measure;

storing, by the real-time rideshare matching system, the identifier of each match candidate of the match pool in the locality-sensitive hashing data structure, wherein the identifier of a match candidate of the match pool is stored in one or more hash buckets of the locality-sensitive hashing data structure, the one or more hash buckets determined based on hashing the preprocessing vector associated with the match candidate;

constructing, by the real-time rideshare matching system, a potential match set for at least one match candidate of the match pool, wherein the potential match set associated with a match candidate of the at least one match candidate comprises identifiers retrieved from one or more hash buckets of the locality-sensitive hashing data structure, the one or more hash buckets determined based on hashing the query vector associated with the match candidate;

generating, by the real-time rideshare matching system, a rideshare trip based at least in part on the potential match set associated with a match candidate of the match pool, wherein the rideshare trip comprises a driver of the at least one driver and one or more ride requests of the at least one ride request;

assigning, by the real-time rideshare matching system, one or more ride requests of the at least one ride request to a driver of the at least one driver based on the rideshare trip to be served by the driver; and updating, by the real-time rideshare matching system, the route of a driver of the at least one driver based on the rideshare trip to serve one or more ride requests assigned to the driver.

11. The computer-implemented method of claim 10, wherein the cost component of the route profile associated with a match candidate of the match pool is determined based on features of the potential route corresponding to the route component of the route profile, the features comprising the length of the potential route, a potential duration of traversing the potential route at the potential time corresponding to the time component of the route profile, potential taxes and tolls to be incurred in traversing the potential route, or a combination thereof.

12. The computer-implemented method of claim 10, wherein generating a rideshare trip based at least in part on the potential match set associated with a match candidate of the match pool comprises using optimization methods comprising heuristic methods, greedy methods, dynamic programming, constraint satisfaction programming, or a combination thereof.

13. The computer-implemented method of claim 10, wherein the vector similarity measure is based on inner product similarity.

14. The computer-implemented method of claim 10, wherein generating a rideshare trip based at least in part on the potential match set associated with a match candidate of the match pool comprises optimizing based on predicted future ride requests using stochastic optimization methods comprising stochastic programming, approximate dynamic programming, neural methods, or a combination thereof.

15. The computer-implemented method of claim 10, wherein at least one pre-scheduled future ride request is included as a match candidate in the match pool.

16. The computer-implemented method of claim 10, wherein the model associated with a match candidate of the match pool comprises at least one route segment profile constructed based on the route profile of the match candidate, wherein a route segment profile of the at least one route segment profile comprises a route segment component corresponding to a route segment of the potential route corresponding to the route component of the route profile, a time segment component corresponding to a potential time of traversing the route segment by the match candidate determined based on the time component of the route profile, and a cost segment component corresponding to a potential cost of traversing the route segment determined based on the cost component of the route profile.

17. The computer-implemented method of claim 16, wherein the degree of similarity between the model associated with a first match candidate of the match pool and the model associated with a second match candidate of the match pool is determined based on an overlap between the model associated with the first match candidate and the model associated with the second match candidate.

18. The computer-implemented method of claim 10, further comprising, responsive to a plurality of route profiles for a match candidate of the match pool being obtained, performing operations comprising:

constructing, by the real-time rideshare matching system, a plurality of models for the match candidate, wherein the plurality of models comprises a model corresponding to each route profile of the plurality of route profiles;

constructing, by the real-time rideshare matching system, a plurality of preprocessing vectors for the match candidate, wherein the plurality of preprocessing vectors comprises a preprocessing vector corresponding to each model of the plurality of models; and storing, by the real-time rideshare matching system, the identifier of the match candidate in the locality-sensitive hashing data structure, wherein the identifier is stored in one or more hash buckets of the locality-sensitive hashing data structure, the one or more hash buckets determined based on hashing each preprocessing vector of the plurality of preprocessing vectors.

19. The computer-implemented method of claim 10, further comprising, responsive to a plurality of route profiles for a match candidate of the match pool being obtained, performing operations comprising:

constructing, by the real-time rideshare matching system, a plurality of models for the match candidate, wherein the plurality of models comprises a model corresponding to each route profile of the plurality of route profiles;

constructing, by the real-time rideshare matching system, a plurality of query vectors for the match candidate, wherein the plurality of query vectors comprises a query vector corresponding to each model of the plurality of models; and constructing, by the real-time rideshare matching system, a potential match set for the match candidate, wherein the potential match set comprises identifiers retrieved from one or more hash buckets of the locality-sensitive hashing data structure, the one or more hash buckets determined based on hashing each query vector of the plurality of query vectors.

20. The computer-implemented method of claim 10, further comprising post-processing, by the real-time rideshare matching system, the potential match set associated with a match candidate of the match pool to filter or augment the potential match set using heuristics comprising Haversine distance approximations, directional route similarity, spatial proximity, or a combination thereof.

* * * * *